(12) United States Patent
Kawashima (10) Patent No.: US 9,079,716 B2
(45) Date of Patent: Jul. 14, 2015

(54) CONVEYING ROLLER UNIT, SHEET CONVEYING DEVICE, AND IMAGE PROCESSING APPARATUS

(71) Applicant: KYOCERA Document Solutions Inc., Osaka-shi, Osaka (JP)

(72) Inventor: Tetsuro Kawashima, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/497,217

(22) Filed: Sep. 25, 2014

(65) Prior Publication Data

US 2015/0090562 A1 Apr. 2, 2015

(30) Foreign Application Priority Data

Sep. 30, 2013 (JP) ................. 2013-203542

(51) Int. Cl.
*B65H 3/06* (2006.01)
*B65G 13/04* (2006.01)
*B41J 2/00* (2006.01)

(52) U.S. Cl.
CPC .. *B65G 13/04* (2013.01); *B41J 2/00* (2013.01)

(58) Field of Classification Search
CPC ............... B65H 3/06; B65H 2402/515; B65H 2402/60; B65H 2402/63; B65H 2402/631; B65H 2402/632; B65H 2601/324
See application file for complete search history.

(56) References Cited

FOREIGN PATENT DOCUMENTS

JP 11222323 A 8/1999

*Primary Examiner* — Michael McCullough
(74) *Attorney, Agent, or Firm* — Alleman Hall McCoy Russell & Tuttle LLP (57) ABSTRACT

A manual sheet feeder that is an example of a sheet conveying device includes a roller unit in which a rubber roller is mounted on a support member. A separation wall is formed in an internal space of the support member, and a rotation shaft is formed at the separation wall. A slide shaft is provided such that a coil spring is interposed between the rotation shaft and the slide shaft in a compressed state. Movement of the slide shaft from an opening outward in an axial direction is restricted by an elastic engagement piece of a movement restriction mechanism. The elastic engagement piece is formed at a spring holding portion of the slide shaft. In a state where the coil spring is stored in the spring holding portion, a back surface of the elastic engagement piece is supported by the coil spring.

7 Claims, 9 Drawing Sheets

CONVEYING ROLLER UNIT, SHEET CONVEYING DEVICE, AND IMAGE PROCESSING APPARATUS

INCORPORATION BY REFERENCE

This application is based upon and claims the benefit of priority from the corresponding Japanese Patent Application No. 2013-203542 filed on Sep. 30, 2013, the entire contents of which are incorporated herein by reference.

BACKGROUND

The present disclosure relates to a conveying roller unit that conveys a sheet member by rotating in contact with the sheet member, a sheet conveying device, and an image processing apparatus including the sheet conveying device.

A conventional image forming apparatus such as a copy machine, a printer, or the like includes a sheet conveying device. The sheet conveying device takes out and conveys a sheet member stored in a sheet feed cassette. The sheet conveying device includes a rotary roller (conveying roller) that rotates in contact with a sheet member. When a rotational driving force in one direction is transferred from a motor or the like to the rotary roller, the rotary roller conveys the sheet member in a predetermined direction. A rotation shaft of the rotary roller is connected to a drive shaft that transfers a rotational driving force of the motor, by means of a coupling.

As such a sheet conveying device, a device is known which includes a mechanism that allows a deteriorated rotary roller to be easily replaced. A conventional typical sheet feeder includes a fixing mechanism that fixes a sheet feed roller to a drive shaft in a state where the sheet feed roller is fitted to the drive shaft, and replacement of the sheet feed roller is allowed by releasing the fixing by the fixing mechanism.

In addition, a coupling connection mechanism is known which connects a rotation shaft of a rotary roller to a drive shaft that transfers a rotational driving force from a motor, by means of a coupling. A typical coupling connection mechanism includes an elastic member provided on a rotation shaft of a rotary roller, such as a spring, and the rotation shaft is supported via the elastic member. Thus, when the rotation shaft of the rotary roller is pressed in a direction in which the elastic member is contracted, the elastic member is contracted, and the rotation shaft is retracted into the rotary roller. Therefore, the user is allowed to disconnect the rotation shaft from the coupling connection mechanism by pressing the rotation shaft toward the inner side of the rotary roller. Accordingly, the user is allowed to easily remove the rotary roller.

The coupling connection mechanism requires a fixing mechanism to restrict the rotation shaft from moving in an axial direction by the elastic member. As the fixing mechanism, it is possible to use an elastic engagement claw. The elastic engagement claw is a mechanism that mechanically fixes the rotation shaft by a claw portion being engaged with a recess formed in a member biased by elasticity. The mechanism is referred to as snap fit.

SUMMARY

A conveying roller unit according to one aspect of the present disclosure includes a support member, a first rotation shaft portion, a second rotation shaft portion, and a biasing member. The support member is formed in a cylindrical shape having an internal space, and includes an outer peripheral portion on which a roller member is provided. The first rotation shaft portion is provided at a first side surface of the support member at one side in an axial direction thereof and is formed in a cylindrical shape including a tubular space therein forming a part of the internal space. The second rotation shaft portion has one end portion inserted from a second side surface of the support member at another side in the axial direction through the internal space of the support member into the tubular space of the first rotation shaft portion, and another end portion protruding from the second side surface of the support member, and is supported by the support member so as to be slidable in the axial direction. The biasing member is provided from the one end portion side to the tubular space side in the internal space and configured to bias the second rotation shaft portion along the axial direction toward the other end side. The one end portion of the second rotation shaft portion includes a tubular storage portion configured to be able to store the biasing member therein. The tubular storage portion includes, at a part of a circumferential surface thereof, an engagement piece extending in the axial direction. The engagement piece includes, at a leading end thereof, a claw portion protruding outward from the circumferential surface, and is configured to be elastically deformable in a retraction direction in which the claw portion is retracted from the circumferential surface toward an inner side. The first rotation shaft portion has, in a circumferential surface thereof, a slit which extends in the axial direction and with which the claw portion is engageable. The engagement piece is configured to be brought into contact with a side surface of the biasing member at an engagement position where the claw portion is engaged with an end portion of the slit at the base end portion side, by a biasing force of the biasing member, whereby elastic deformation of the engagement piece in the retraction direction is prevented.

A sheet conveying device according to another aspect of the present disclosure is configured such that the conveying roller unit is mountable thereon and dismountable therefrom. The sheet conveying device includes a drive transfer mechanism configured to transfer a rotational driving force to the conveying roller unit in a state where the conveying roller unit is mounted.

An image processing apparatus according to still another aspect of the present disclosure includes the sheet conveying device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, a manual sheet feeder 60 and an image processing apparatus 10 including the manual sheet feeder 60 according to an embodiment of the present disclosure will be described with reference to the drawings. It should be noted that, for convenience of explanation, in a state where the image processing apparatus 10 is installed on a flat plane (a state shown in FIG. 1), the vertical direction is defined as an up-down direction 6. In addition, a front-rear direction 7 is defined with, as a front face (front surface), a surface at a side at which an operation display panel 17 is provided. Moreover, a right-left direction 8 is defined based on the front face of the image processing apparatus 10. It should be noted that the following embodiment is merely an example in which the present disclosure is embodied, and therefore does not limit the technical scope of the present disclosure.

Figure 1:
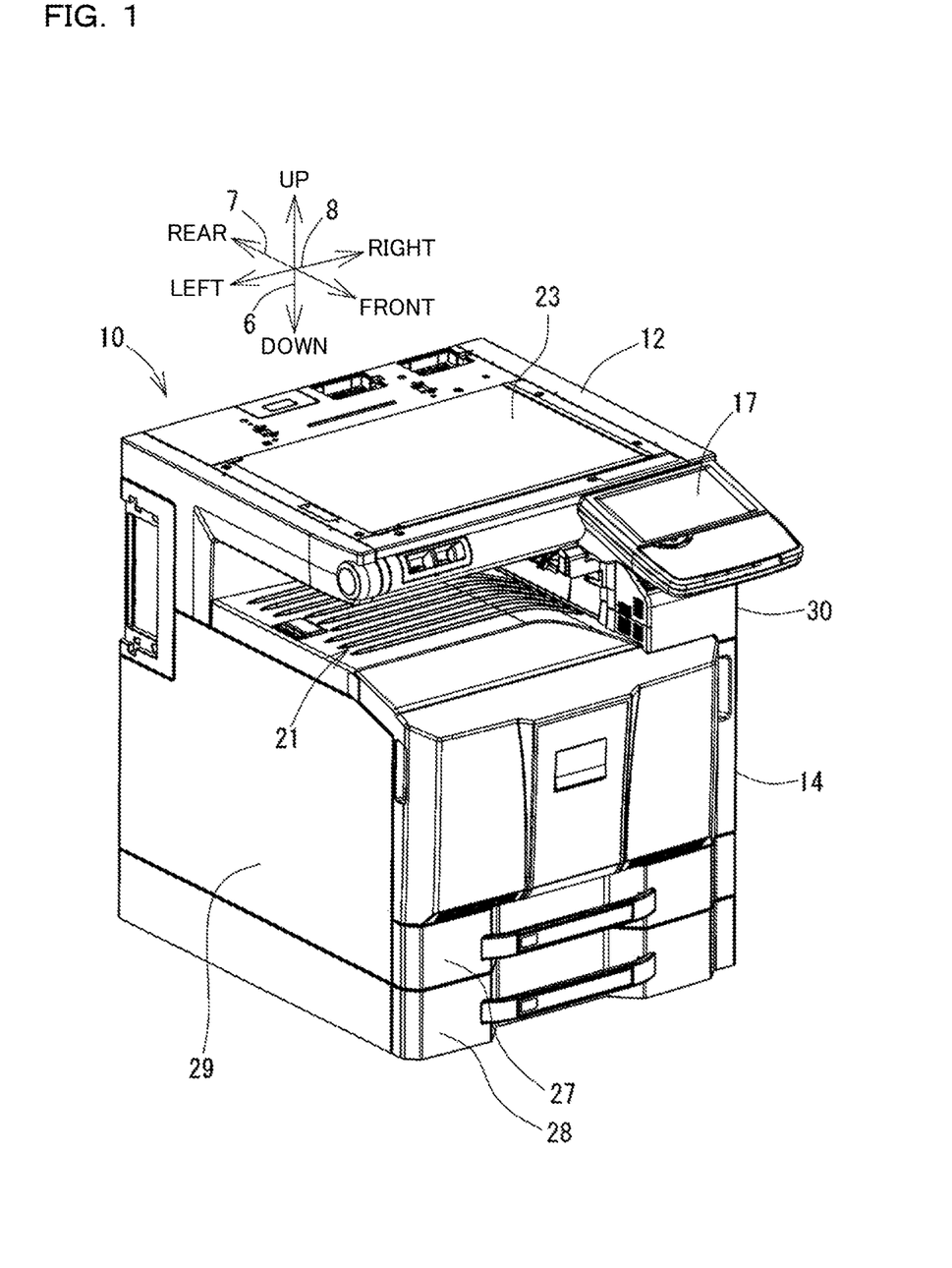
FIG. 1 is a perspective view showing a configuration of an image processing apparatus according to an embodiment of the present disclosure.
Figure 2:
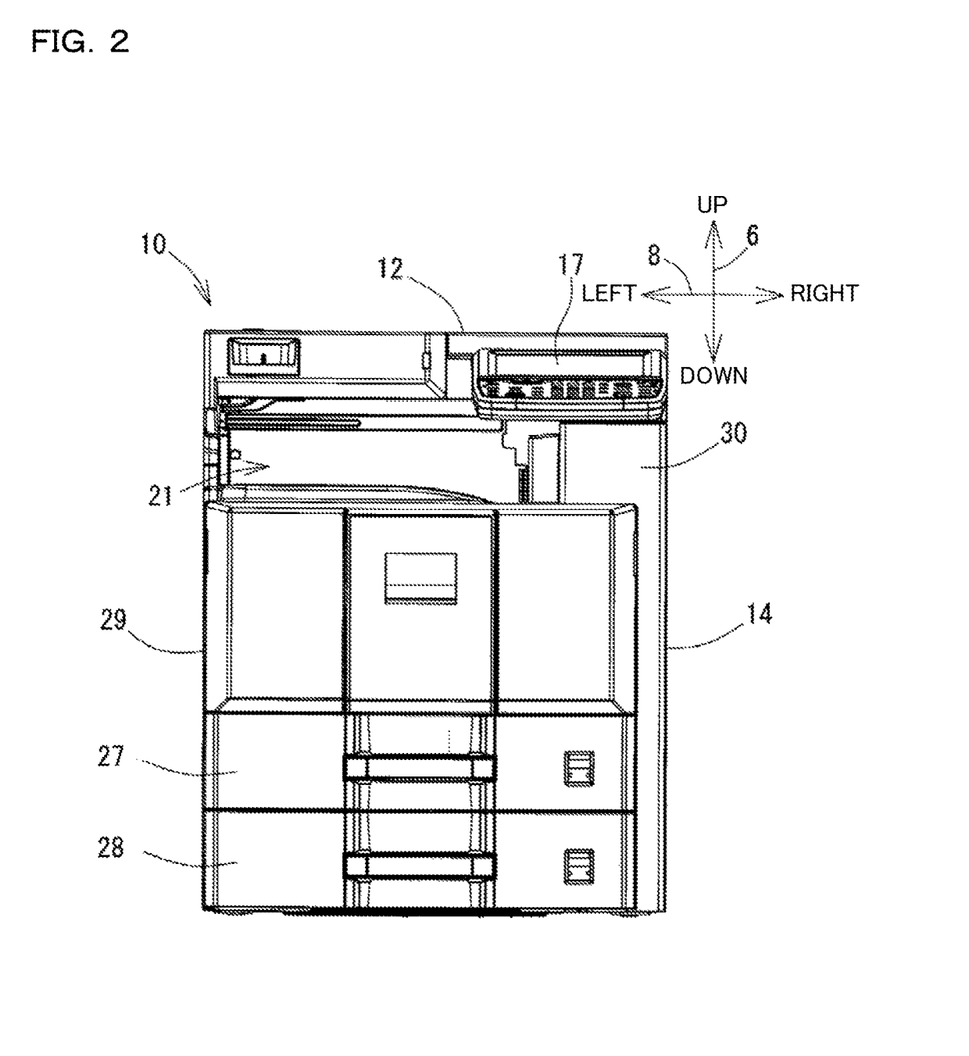
FIG. 2 is a front view showing the configuration of the image processing apparatus in FIG. 1.

First, a schematic configuration of the image processing apparatus 10 will be described with reference to FIGS. 1 to 3. As shown in FIG. 1, the image processing apparatus 10 is a multifunction peripheral referred to as a so-called in-body discharge type, and has functions of a printer, a copying machine, a FAX apparatus, a scanner, and the like. The image processing apparatus 10 forms an inputted image on a print sheet P (an example of a sheet member of the present disclosure) by using a printing material such as toner. It should be noted that the image processing apparatus 10 is not limited to the multifunction peripheral, and the present disclosure is applicable even when the image processing apparatus 10 is a dedicated machine such as a printer, a copying machine, a FAX apparatus, a scanner, or the like.

The image processing apparatus 10 includes a scanner 12 and an image forming device 14. The scanner 12 performs a process of reading an image on a document, and is provided at an upper portion of the image processing apparatus 10. The image forming device 14 performs a process of forming an image on the basis of an electrophotographic method, and is provided below the scanner 12. In addition, the image forming device 14 includes two sheet feed cassettes 27 and 28 arranged vertically at two stages. The sheet feed cassette 27 at the upper side is provided at a lowermost portion of the image forming device 14 so as to be integrated with a housing 29. The sheet feed cassette 28 at the lower side is of an extension type connected as an option device to the bottom of the housing 29 of the image forming device 14. The sheet feed cassette 28 is configured to be attachable to and detachable from the bottom of the image forming device 14. In addition, a sheet discharge portion 30 is provided at the right side of the image forming device 14. It should be noted that the image forming device 14 is not limited to an electrophotographic type, and may be an inkjet recording type or may be another recording type or another print type.

A sheet discharge space 21 to which a print sheet is discharged is provided above the image forming device 14. The sheet discharge portion 30 is provided so as to connect the image forming device 14 to the scanner 12 while forming the sheet discharge space 21 between the image forming device 14 and the scanner 12. In the present embodiment, as shown in FIG. 1, the front side and the left side of the sheet discharge space 21 are opened. In addition, the rear side and the right side of the sheet discharge space 21 are not opened, the rear side thereof is closed, and the sheet discharge portion 30 is provided at the right side thereof.

As shown in FIG. 1, the scanner 12 includes a document placement table 23. When the image processing apparatus 10 functions as a copying machine, a document is set on the document placement table 23, and a document cover 24 is closed. Then, a copy start instruction is inputted through the operation display panel 17. Accordingly, a reading operation by the scanner 12 is started, and image data of the document is read. Then, the read image data is sent to the image forming device 14. In FIGS. 1 and 2, the document cover 24 of the scanner 12 is not shown.

Figure 3:
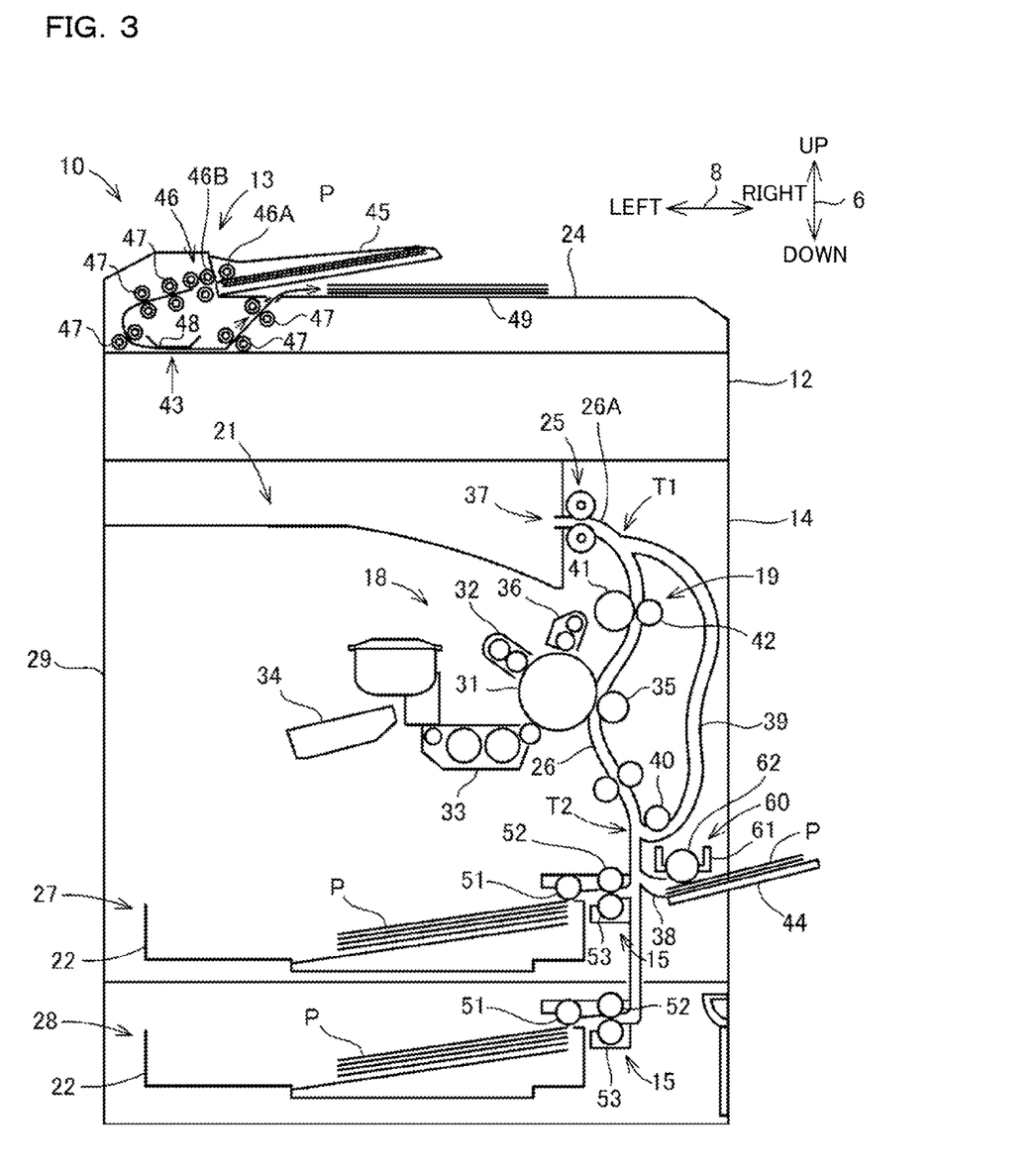
FIG. 3 is a schematic diagram showing an internal configuration of the image processing apparatus in FIG. 1.

In addition, as shown in FIG. 3, the scanner 12 includes an ADF 13. The ADF 13 is provided in the document cover 24. The ADF 13 is an automatic document feeder that includes a document tray 45, a feeding mechanism 46, a plurality of conveying rollers 47, a sheet holder 48, a sheet discharge portion 49, and the like. The ADF 13 conveys a document set on the document tray 45 through a reading position 43 on the document placement table 23 to the sheet discharge portion 49 by driving the feeding mechanism 46 and each conveying roller 47 with a motor (not shown). The feeding mechanism 46 includes: a feed roller 46A that takes out a document; and a conveying roller 46B that conveys the document taken out by the feed roller 46A. The feeding mechanism 46 feeds the document from the document tray 45 by the feed roller 46A and conveys the document to the downstream side in a feeding direction by the conveying roller 46B. Then, the document is further conveyed by the conveying rollers 47 provided at the downstream side in the feeding direction. In the course of conveying the document by the ADF 13, an image on the document passing through the reading position 43 is read by the scanner 12.

The image forming device 14 forms an image on a print sheet P of a specified size such as A size or B size on the basis of image data read by the scanner 12 or externally inputted image data. In the present embodiment, as described later, the image forming device 14 is able to discharge a print sheet P having an image formed on one side thereof to the sheet discharge space 21, or is able to switch back the print sheet P, send the print sheet P to a reverse conveyance path 39, and form an image on the back surface of the print sheet P.

As shown in FIG. 3, the image forming device 14 mainly includes sheet feeders 15, an electrophotographic type image transfer portion 18, a fixing portion 19, a manual sheet feeder 60, a paper sheet sensor 20, a control portion (not shown) that comprehensively controls the image forming device 14, and the like. In addition, the image forming device 14 includes a conveyance motor and a discharge motor (both are not shown). These components are provided within the housing 29 that forms a cover of an outer frame and an inner frame of the image forming device 14 and the like.

The sheet feeders 15 are provided within the image forming device 14 and at the sheet feed cassette 28, respectively. Each sheet feeder 15 takes out and conveys print sheets P stored in the sheet feed cassette 27 or 28 one by one. Each sheet feeder 15 includes a pick-up roller 51, a feed roller 52, and a retard roller 53. The feed roller 52 is located at the upper side of the retard roller 53, and these rollers form a conveying roller pair in a state of being brought into pressure contact with each other. Each of the sheet feed cassettes 27 and 28 includes a tray-shaped paper sheet storage portion 22, and print sheets P on which images are to be formed by the image transfer portion 18 are placed in the paper sheet storage portion 22. The pick-up roller 51 and the feed roller 52 are provided at the upper side of a right end portion of the paper sheet storage portion 22. When an instruction for feeding the print sheet P is inputted to the image processing apparatus 10, the conveyance motor is rotationally driven. Accordingly, the pick-up roller 51 and the feed roller 52 are rotated, and thus the retard roller 53 rotates so as to follow this rotation. Then, the print sheet P is fed by the pick-up roller 51 from the paper sheet storage portion 22 disposed at a sheet feed position, and conveyed by the feed roller 52 to the downstream side in a feeding direction of the print sheet P. A vertical conveyance path 26 is formed so as to extend upward from the feed roller 52. As shown in FIG. 3, the vertical conveyance path 26 extends upward at the right side surface side of the housing 29, and the end thereof reaches the sheet discharge space 21. The print sheet P is conveyed by the feed roller 52 upward along the vertical conveyance path 26.

The image transfer portion 18 is provided above the sheet feeders 15. The image transfer portion 18 performs an image transfer process on the print sheet P transferred from each of the sheet feed cassettes 27 and 28 or the manual sheet feeder 60. Specifically, on the basis of inputted image data, the image transfer portion 18 transfers a toner image to the print sheet P by using a printing material such as toner. As shown in FIG. 3, the image transfer portion 18 includes a photosensitive drum 31, a charging portion 32, a developing portion 33, an LSU (Laser Scanning Unit) 34, a transfer roller 35, and a cleaning portion 36. The photosensitive drum 31 is provided at the left side of the vertical conveyance path 26. When an image forming operation is started, the surface of the photosensitive drum 31 is charged at a uniform potential by the charging portion 32. In addition, the LSU 34 scans the photosensitive drum 31 with laser light corresponding to image data. Accordingly, an electrostatic latent image is formed on the photosensitive drum 31. Then, toner is attached to the electrostatic latent image by the developing portion 33, whereby a toner image is formed on the photosensitive drum 31. The transfer roller 35 is provided at the right side of the vertical conveyance path 26 and disposed so as to face the photosensitive drum 31 across the vertical conveyance path 26. When the print sheet P passing through the vertical conveyance path 26 passes through a nip portion of the transfer roller 35 and the photosensitive drum 31, the toner image is transferred onto the print sheet P by the transfer roller 35. The print sheet P on which the toner image has been transferred is conveyed through the vertical conveyance path 26 to the fixing portion 19 that is disposed at the downstream side of the image transfer portion 18 in a conveying direction of the print sheet P (i.e., at the upper side thereof).

The fixing portion 19 fixes the toner image transferred onto the print sheet P, on the print sheet P with heat. The fixing portion 19 includes a heating roller 41 and a pressure roller 42. The pressure roller 42 is biased toward the heating roller 41 side by an elastic member such as a spring. Accordingly, the pressure roller 42 is brought into pressure contact with the heating roller 41. The heating roller 41 is heated to high temperature by a heating portion such as a heater during the fixing operation. While the print sheet P passes through the fixing portion 19, the toner forming the toner image is heated to melt by the heating roller 41, and further the print sheet P is pressed by the pressure roller 42. As a result, the toner is fixed on the print sheet P by the fixing portion 19. Accordingly, the toner image is fixed on the print sheet P, whereby an image is formed on the print sheet P.

A paper sheet discharge port 37 through which the print sheet P is discharged is provided at the end of the vertical conveyance path 26. In other words, the vertical conveyance path 26 is provided from the feed roller 52 to the paper sheet discharge port 37. A portion 26A (hereinafter, referred to as "curved path 26A") near the end of the vertical conveyance path 26, specifically, extending from a branch point T1 at the downstream side of the fixing portion 19 to the paper sheet discharge port 37 in the vertical conveyance path 26 is curved from the vertical direction to the horizontal direction. A discharge roller pair 25 is provided near the paper sheet discharge port 37 so as to be rotatable in either direction by the discharge motor (not shown). The print sheet P conveyed to the curved path 26A through the fixing portion 19 is conveyed through the paper sheet discharge port 37 toward the sheet discharge space 21 by the discharge roller pair 25 that is rotated in a forward rotation direction by the discharge motor.

When one-side printing is performed in the image forming device 14, the print sheet P having an toner image transferred onto one side thereof by the image transfer portion 18 passes through the fixing portion 19, then moves in the vertical conveyance path 26, and is discharged through the paper sheet discharge port 37 to the outside.

On the other hand, when double-sided printing is performed in the image forming device 14, the print sheet P having an image formed initially on one side thereof passes through the fixing portion 19, then the front and back sides of the print sheet P are reversed, and the print sheet P is conveyed in the reverse direction from the upstream side in the conveying direction of the print sheet P again and is sent to the reverse conveyance path 39. Specifically, in a state where the leading end of the print sheet P having the image formed on the one side thereof is exposed from the paper sheet discharge port 37 to the outside, the discharge roller pair 25 is stopped. At that time, the rear end of the print sheet P is held in a state of being nipped by the discharge roller pair 25 near the paper sheet discharge port 37. Then, the discharge roller pair 25 is reversely rotated by reverse rotational driving of the discharge motor (not shown). Accordingly, the print sheet P is conveyed in the curved path 26A again in the reverse direction. In other words, the print sheet P is reversely conveyed in the curved path 26A. As shown in FIG. 3, in the image forming device 14, the reverse conveyance path 39 is formed so as to branch from the curved path 26A and merge with the vertical conveyance path 26 at the upstream side in the conveying direction of the print sheet P when being seen from the image transfer portion 18 side. The reverse conveyance path 39 is formed at the right side of the vertical conveyance path 26 in the housing 29. The reverse conveyance path 39 is a vertical conveyance path extending vertically generally parallel to the vertical conveyance path 26. The branch point T1 of the reverse conveyance path 39 is located between the fixing portion 19 and the discharge roller pair 25 in the curved path 26A. And a merging point T2 of the reverse conveyance path 39 is located between the fixing portion 19 and the feed roller 52 provided at the sheet feed cassette 27 in the curved path 26A.

The print sheet P sent from the curved path 26A to the reverse conveyance path 39 is guided downward in the reverse conveyance path 39. On the reverse conveyance path 39, a conveying roller 40 is provided near the merging point T2. The print sheet P guided downward in the reverse conveyance path 39 is sent to the vertical conveyance path 26 again by the conveying roller 40 before the merging point T2. Then, the print sheet P is conveyed to the image transfer portion 18 again through the vertical conveyance path 26. A surface of the print sheet P having reached the image transfer portion 18 on which surface no image has been formed faces the photosensitive drum 31. Then, by the print sheet P sequentially passing through the image transfer portion 18 and the fixing portion 19, an image is formed on the surface at the opposite side on which no image has been formed. Thereafter, the print sheet P having the images formed on both sides thereof is moved in the curved path 26A and is discharged through the paper sheet discharge port 37 to the sheet discharge space 21 by the discharge roller pair 25 that has been returned to forward rotation.

A manual tray 44 is provided at the right side surface of the housing 29 so as to be rotatably supported by the housing 29. The manual tray 44 forms a portion of the right side surface of the housing 29 in a state of being closed with respect to the housing 29. When the manual tray 44 is opened with respect to the housing 29, the manual tray 44 is supported in such an attitude as to be slightly inclined upward as shown in FIG. 3. In other words, in the opened state, the manual tray 44 is gently inclined downward toward the downstream side in a feeding direction toward the interior of the housing 29. In this state, the manual tray 44 allows a plurality of print sheets P to be placed on the upper surface thereof. In addition, when the manual tray 44 is opened with respect to the housing 29, the manual tray 44 opens a sheet feed opening 38 that is a feed path, for the print sheet P, extending from the manual tray 44 to the vertical conveyance path 26. The manual sheet feeder 60 is provided above the sheet feed opening 38. The manual sheet feeder 60 conveys the print sheet P placed on the manual tray 44, through the sheet feed opening 38 to the vertical conveyance path 26.

In such a configuration in which the manual tray 44 and the manual sheet feeder 60 are provided, the print sheet P sent from the manual tray 44 may be jammed at the sheet feed opening 38. In this case, a user is allowed to pull out the print sheet P jammed at the sheet feed opening 38, with the manual tray 44 opened. At that time, when the jammed print sheet P is in a state of being brought into pressure contact with a rubber roller 87 of a later-described roller unit 62 of the manual sheet feeder 60, the roller unit 62 rotates due to contact friction with the rubber roller 87 in pulling out the print sheet P. The rotation direction in this case is not a forward rotation direction 83 (see FIG. 4) when the print sheet P is conveyed from the manual tray 44, and is a rotation direction that is opposite to the forward rotation direction 83. In the present embodiment, the manual sheet feeder 60 is designed such that the roller unit 62 is not easily removed even when the roller unit 62 is reversely rotated in the direction opposite to the forward rotation direction 83.

Next, a configuration of the manual sheet feeder 60 will be described with reference to FIGS. 4 to 9B. Here, FIG. 4 is a perspective view of the manual sheet feeder 60 in the housing 29, showing a state where the manual tray 44 is opened, and only the manual sheet feeder 60 and the manual tray 44 that are supported by a support frame 54 are shown.

Figure 4:
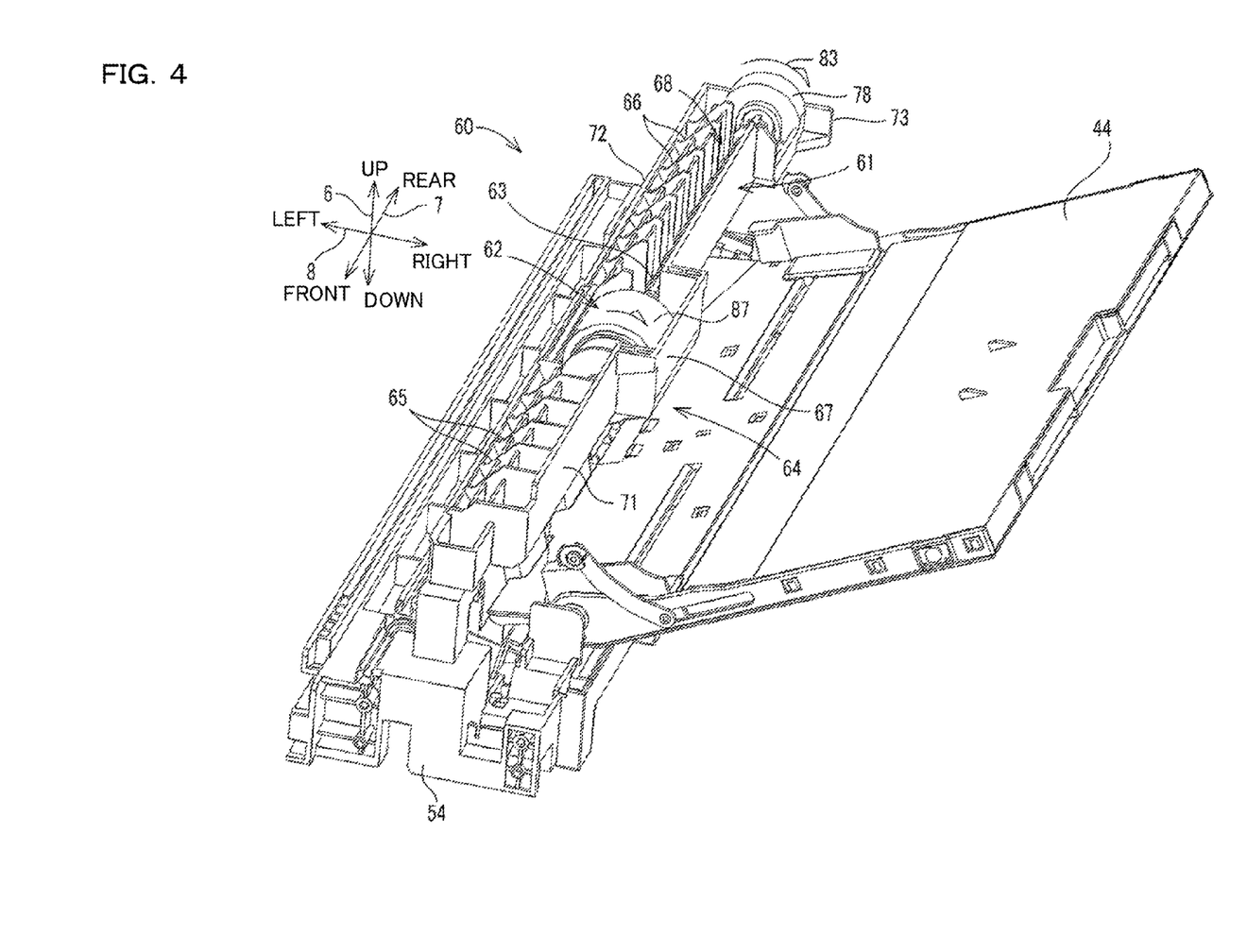
FIG. 4 is a perspective view showing a configuration of a manual sheet feeder of the image processing apparatus in FIG. 1.

As shown in FIG. 4, the manual sheet feeder 60 is mounted on the support frame 54. The support frame 54 is an inner frame of the housing 29 and is provided below the merging point T2 of the vertical conveyance path 26 and the reverse conveyance path 39. The support frame 54 is formed in a shape that is long in the front-rear direction 7 of the housing 29. The manual tray 44 is rotatably supported by the support frame 54.

Figure 5:
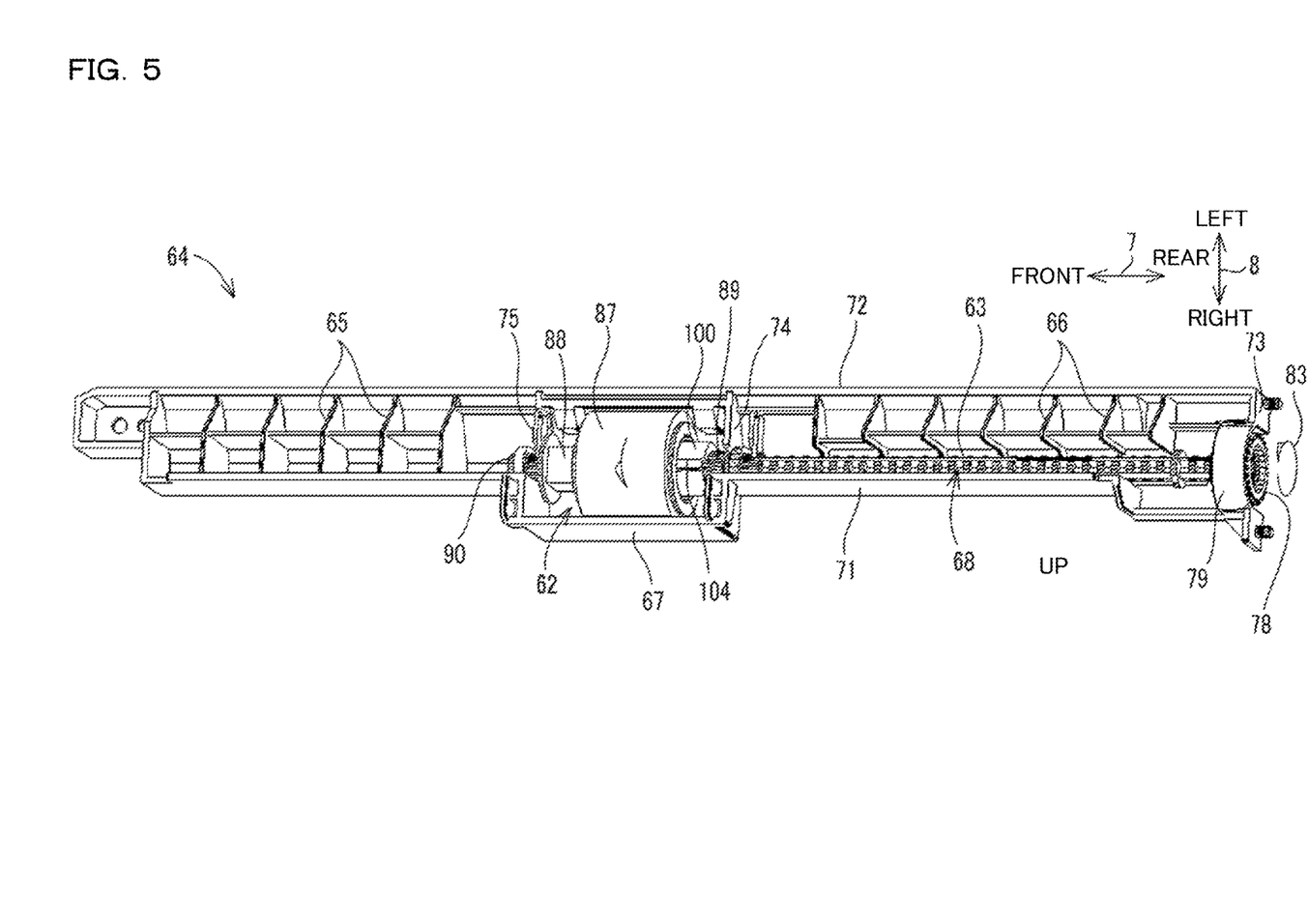
FIG. 5 is a perspective view showing a configuration of a sheet feed unit of the manual sheet feeder in FIG. 4.

As shown in FIGS. 4 and 5, the manual sheet feeder 60 includes a sheet feed unit 64. The sheet feed unit 64 includes a base frame 61, the roller unit 62 (an example of a conveying roller unit of the present disclosure), and a drive shaft 63. The base frame 61 is formed by injection-molding a synthetic resin or the like. The base frame 61 is formed in a shape that is long in the front-rear direction 7, similarly to the support frame 54. The base frame 61 is fixed to the support frame 54 and the like. Specifically, an end portion of the base frame 61 at the rear side is fixed to a frame of the housing 29, and an end portion thereof at the front side is fixed to the support frame 54 by means of a fastener such as a screw which is not shown. The roller unit 62 and the drive shaft 63 are mounted on the base frame 61.

The base frame 61 is formed in a rectangular parallelepiped shape with a small width. The base frame 61 has an internal space whose upper surface is opened and which is surrounded by a bottom wall and side walls thereof in four directions. In addition, a rectangular roller storage portion 67 at which a right side wall 71 partially protrudes rightward is formed at a center portion of the base frame 61 in the longitudinal direction thereof (the front-rear direction 7). The roller unit 62 is rotatably stored in the roller storage portion 67. The roller storage portion 67 is penetrated at the bottom side thereof. That is, the roller storage portion 67 does not have a bottom surface and is penetrated at the bottom side thereof. In other words, the roller storage portion 67 does not have a bottom surface and is opened at the bottom side thereof. In a state where the roller unit 62 is stored in the roller storage portion 67, a roller surface of the roller unit 62 is exposed from the opening at the bottom side to the sheet feed opening 38 (see FIG. 3) to be contactable with the print sheet P.

In a portion of the base frame 61 other than the roller storage portion 67, a plurality of reinforcing ribs 65 and 66 are formed so as to be spaced apart from each other at equal intervals in the longitudinal direction of the base frame 61. The reinforcing ribs 65 and 66 are formed so as to stand upward perpendicularly from the bottom wall of the base frame 61. A plurality of the reinforcing ribs 65 at the front side are formed so as to be connected to the side walls 71 and 72 at both sides in the lateral direction of the base frame 61 (the right-left direction 8). Meanwhile, a plurality of the reinforcing ribs 66 at the rear side are provided so as to be spaced apart from the right side wall 71 of the base frame 61 at a predetermined interval. Thus, at the rear side of the base frame 61, a shaft storage portion 68 is formed between the plurality of the reinforcing ribs 66 and the side wall 71. The drive shaft 63 is stored in the shaft storage portion 68.

As shown in FIG. 5, the roller storage portion 67 includes separation walls 74 and 75 separated from each other in the longitudinal direction of the base frame 61. The roller storage portion 67 is defined by the separation walls 74 and 75 and the side walls 71 and 72. Bearings (not shown) are provided at the separation walls 74 and 75, respectively, so as to rotatably support to-be-supported portions 89 and 90 of the roller unit 62. The bearings are grooves recessed downward from the upper ends of the separation walls 74 and 75 in a U shape, and the to-be-supported portions 89 and 90 are supported by the bearings. A configuration of the roller unit 62 will be described later.

Figure 6:
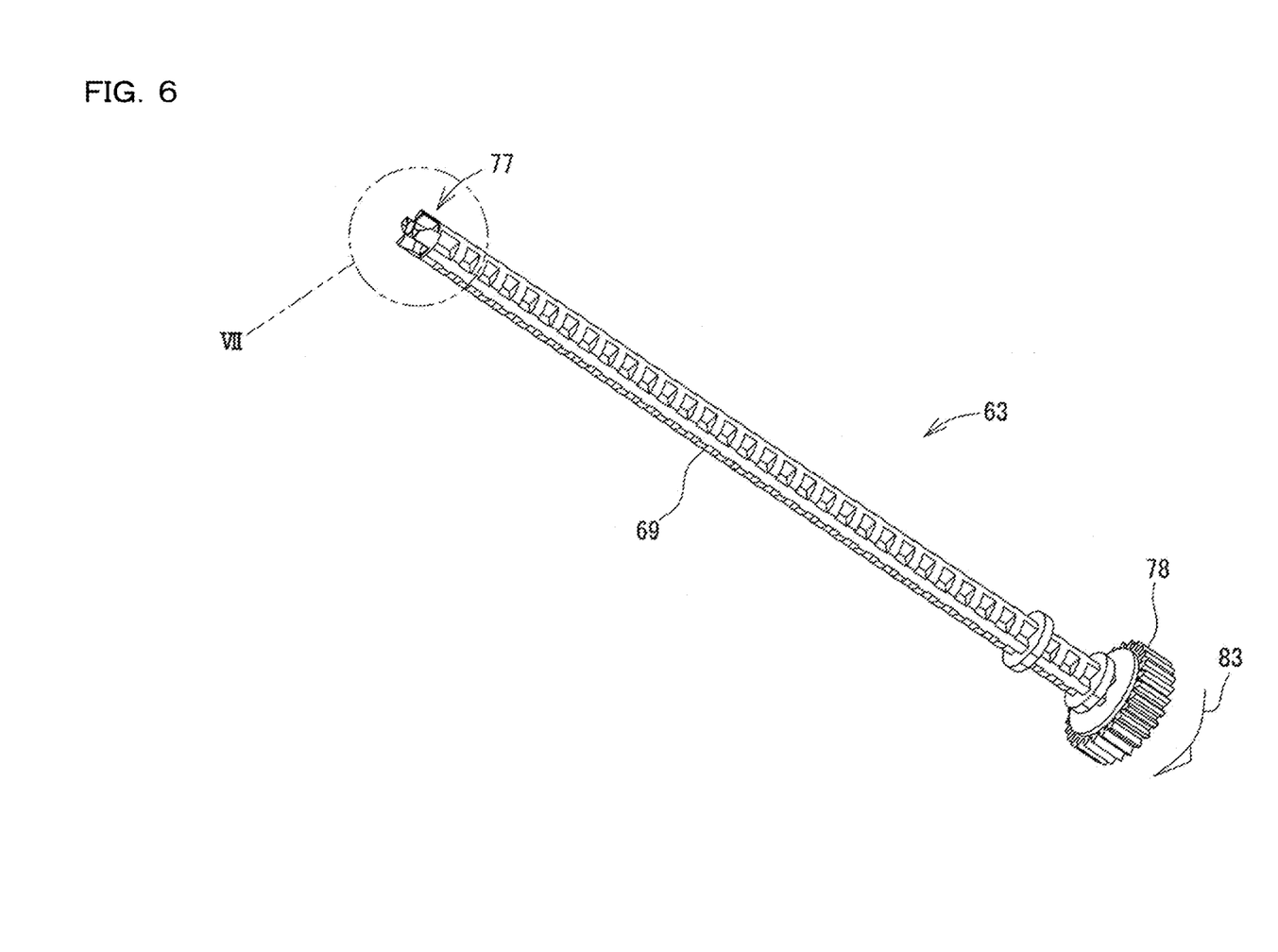
FIG. 6 is a perspective view showing a configuration of a drive shaft of the manual sheet feeder in FIG. 4.

The drive shaft 63 is formed by injection-molding a synthetic resin or the like. In a state where the drive shaft 63 is stored in the shaft storage portion 68, the drive shaft 63 rotates in the predetermined forward rotation direction 83 (see arrows in FIGS. 4 to 8) by a rotational driving force being transferred thereto from a motor which is not shown. As shown in FIG. 6, the drive shaft 63 includes a shaft portion 69, a coupling 77 (an example of a drive-side coupling of the present disclosure), and a drive gear 78. The shaft portion 69 is disposed within the shaft storage portion 68. The coupling 77 is formed at one end of the shaft portion 69, namely, at an end portion of the shaft portion 69 at a later-described coupling 91 (an example of a roller-side coupling of the present disclosure, see FIG. 8) side. The coupling 77 is formed so as to be integrated with the end portion of the shaft portion 69. The coupling 77 is engaged with the coupling 91 formed at the to-be-supported portion 89 of the roller unit 62 and transfers a rotational driving force in the forward rotation direction 83 from the shaft portion 69 to the to-be-supported portion 89. It should be noted that a drive transfer mechanism of the present disclosure is realized by the drive shaft 63, the coupling 77, and the coupling 91

The drive gear 78 is mounted on the other end of the shaft portion 69. The drive gear 78 is disposed at the rear outer side of a side wall 73 at the rear side of the base frame 61. The side wall 73 has a through hole (not shown) for inserting the shaft portion 69 therethrough. The shaft portion 69 is inserted through the through hole from the outside of the side wall 73, whereby the shaft portion 69 is disposed in the shaft storage portion 68. A gear cover 79 is provided so as to continuously extend inward from the side wall 73. When the drive shaft 63 is inserted to a position where the coupling 77 is engaged with the to-be-supported portion 89 of the roller unit 62, the drive gear 78 is stored in the gear cover 79.

Figure 7:
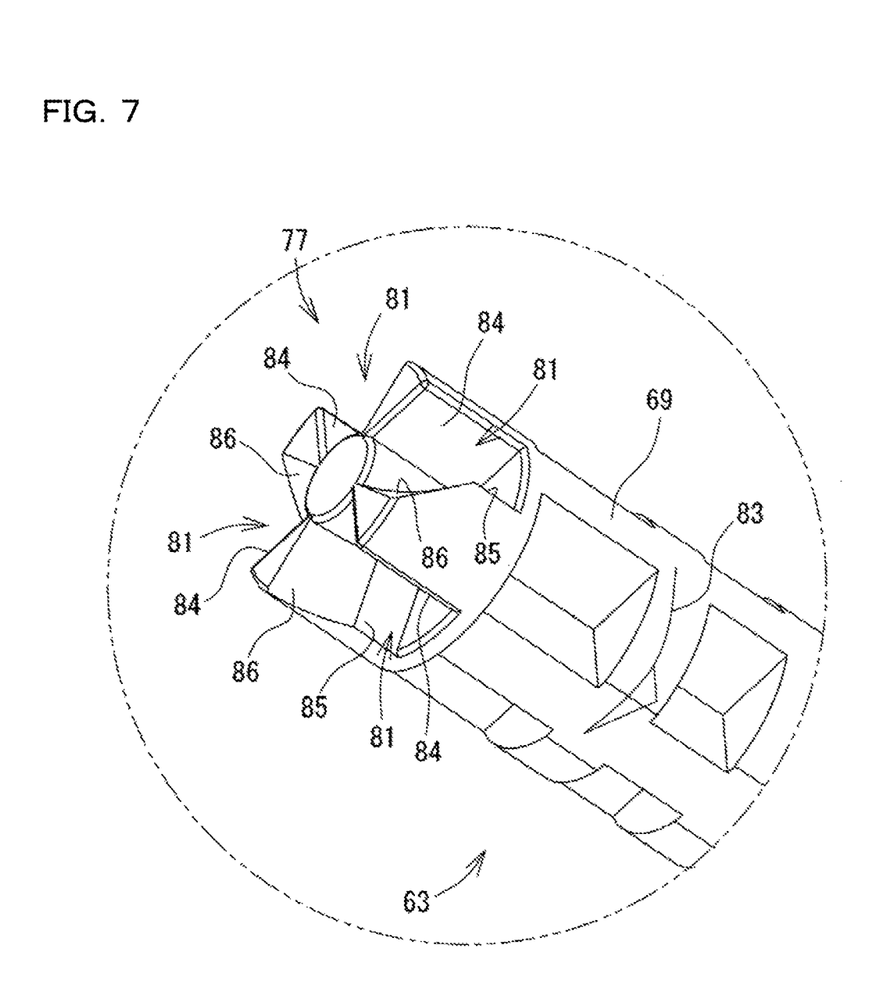
FIG. 7 is an enlarged view of a principal part VII in FIG. 6.

Next, the coupling 77 will be described with reference to FIG. 7. As shown in FIG. 7, the coupling 77 has a plurality of grooves 81 recessed in the axial direction of the drive shaft 63. Each groove 81 is formed in a recess shape recessed generally perpendicularly in the axial direction from the end portion of the shaft portion 69. In the present embodiment, the coupling 77 has four grooves 81 formed at equal intervals in the circumferential direction of the drive shaft 63. These four grooves 81 are engaged with projections 93 of the coupling 91 at the later-described roller unit 62 side and transfer a rotational driving force in the forward rotation direction 83 from the drive shaft 63 to the to-be-supported portion 89 which includes the coupling 91. Therefore, each groove 81 is formed with such a size as to allow the projection 93 of the coupling 91 at the later-described roller unit 62 side to be inserted thereinto.

Each groove 81 has therein a pair of opposed surfaces 84 and 85 opposed to each other in the circumferential direction of the drive shaft 63 and a guide surface 86 connected to the one opposed surface 85. The opposed surface 84 is a side surface of the groove 81 at the upstream side in the forward rotation direction 83. The opposed surface 84 is a flat surface extending in the axial direction of the drive shaft 63. The opposed surface 85 forms a part of a side surface of the groove 81 at the downstream side in the forward rotation direction 83, and is a flat surface extending in the axial direction of the drive shaft 63 similarly to the opposed surface 84. As shown in FIG. 7, the opposed surface 85 is a portion, at the far side in the depth direction of the groove 81 (at the bottom side of the groove 81), of the side surface of the groove 81 at the downstream side in the forward rotation direction 83. Meanwhile, the guide surface 86 is formed so as to extend from the end portion of the opposed surface 85 at the shaft end side and be connected to the opposed surface 85.

The guide surface 86 of each groove 81 is inclined in a direction away from the opposed surface 84. In other words, owing to the guide surface 86, an opening is formed in the groove 81 and at the end portion side of the coupling 77 in the axial direction so as to have a widening shape like an unfolded fan. Since each groove 81 has the widening shape like an unfolded fan as described above, when the coupling 91 at the roller unit 62 side and the coupling 77 at the drive shaft 63 side are engaged with and connected to each other, the projections 93 of the coupling 91 are easily inserted into the grooves 81 of the coupling 77.

Figure 8:
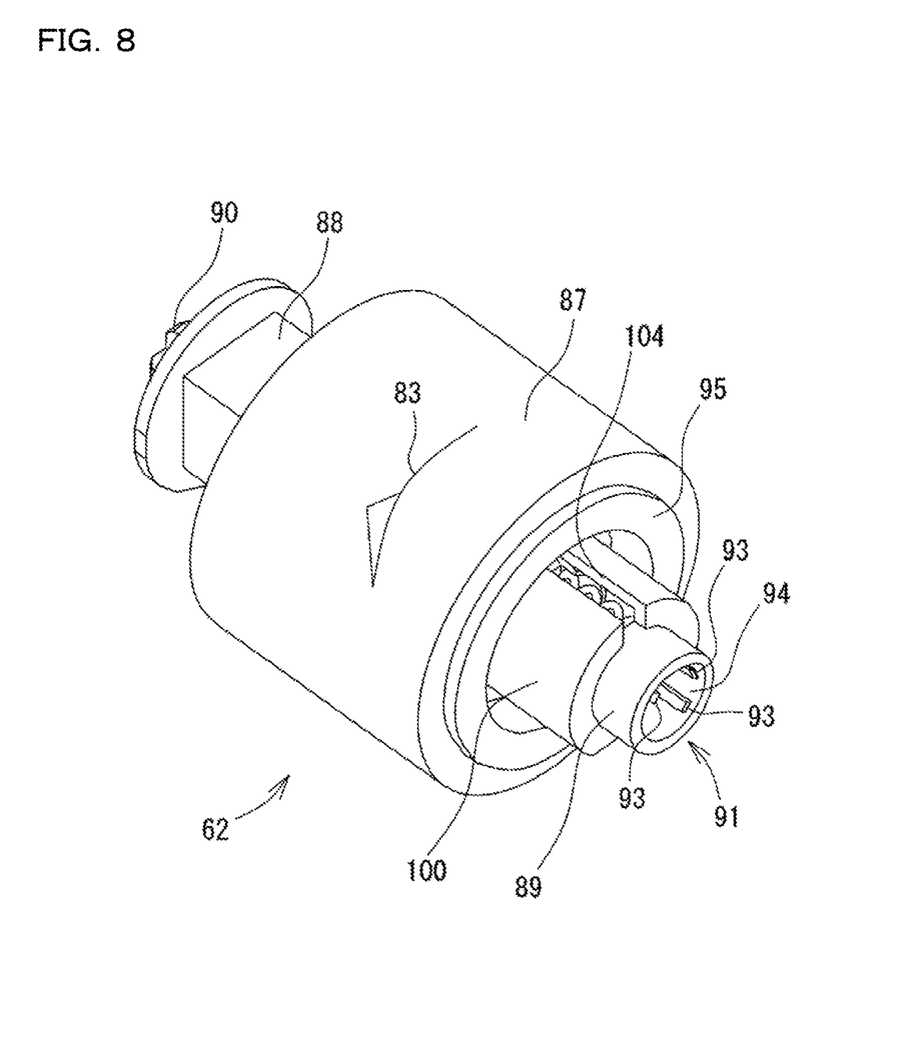
FIG. 8 is a perspective view showing a configuration of a roller unit of the manual sheet feeder in FIG. 4.
Figure 9A:
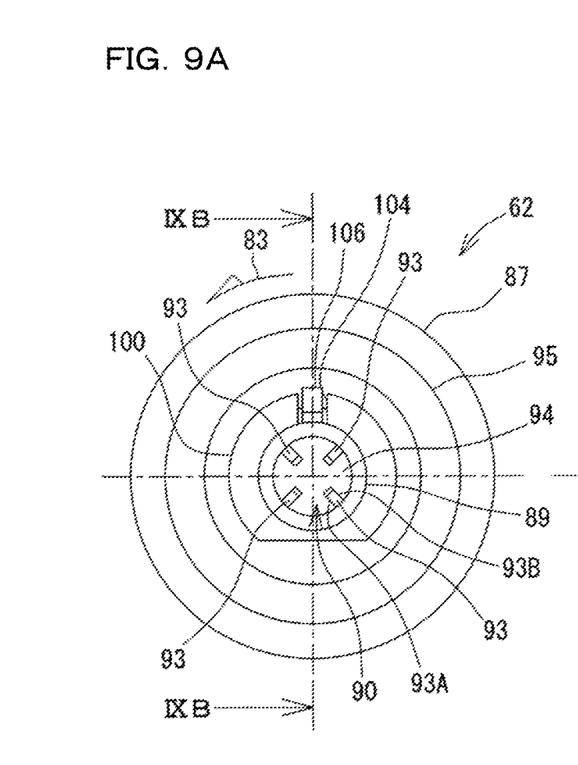
FIGS. 9A and 9B are diagrams showing the configuration of the roller unit in FIG. 8.
Figure 9B:
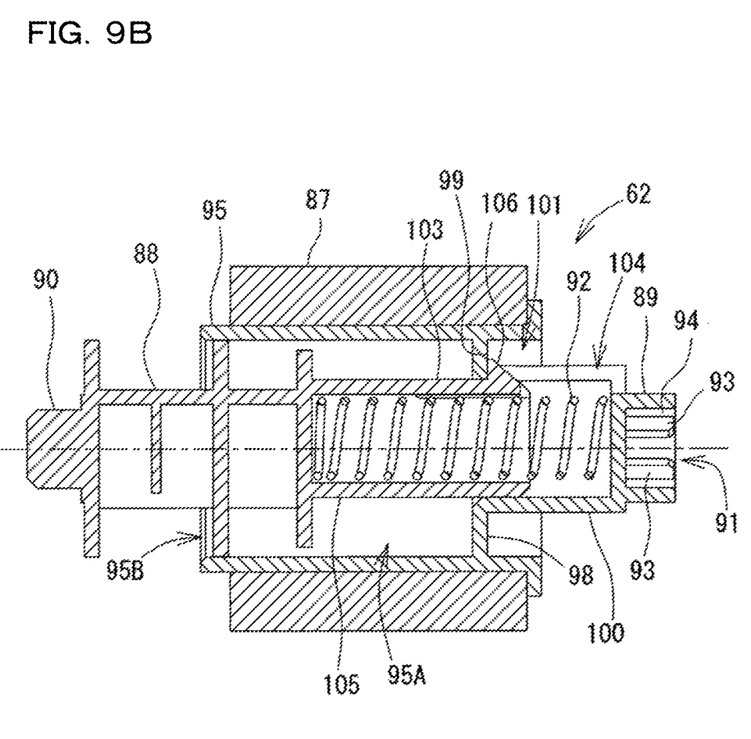

Next, the roller unit 62 will be described with reference to FIGS. 8, 9A, and 9B. The roller unit 62 is an example of the conveying roller unit of the present disclosure, and conveys the print sheet P placed on the manual tray 44, by using a rotational driving force and contact friction. As shown in FIGS. 8, 9A, and 9B, the roller unit 62 includes a support member 95, the rubber roller 87 (an example of a roller member of the present disclosure), a slide shaft 88 (an example of a second rotation shaft portion of the present disclosure), and a coil spring 92 (an example of a biasing member of the present disclosure). The support member 95 is a resin product formed in a cylindrical shape, and an internal space 95A is formed within the support member 95. The rubber roller 87 is provided on an outer peripheral portion of the support member 95. The rubber roller 87 is a tubular roller member formed from an elastic material such as NBR, silicone, or the like. By the support member 95 being inserted into the inner hole of the rubber roller 87, the rubber roller 87 is supported by the support member 95.

A separation wall 98 is provided at a side surface (first side surface) at one side in the axial direction of the central axis of the support member 95 (at the right side in FIG. 9B). An opening of the internal space 95A at the one side is closed by the separation wall 98. The separation wall 98 is formed so as to be integrated with the support member 95.

Specifically, the separation wall 98 includes a cylindrical rotation shaft 100 (an example of a first rotation shaft portion of the present disclosure) projecting outward in the axial direction of the support member 95. The rotation shaft 100 is formed so as to be integrated with the support member 95. The rotation shaft 100 is hollow. The interior of the rotation shaft 100 is opened at the separation wall 98 side and communicates with the internal space 95A of the support member 95. In other words, a tubular space forming a part of the internal space 95A is formed within the rotation shaft 100. Meanwhile, the to-be-supported portion 89 is provided at a leading end portion of the rotation shaft 100 in the projection direction thereof, and the leading end portion of the rotation shaft 100 is closed by the to-be-supported portion 89. The internal space of the rotation shaft 100 is formed with such a size and shape as to allow one end of the coil spring 92 to be stored therein. Therefore, when the coil spring 92 is inserted into the internal space 95A of the support member 95 through an opening 95B at the other side (the left side in FIG. 9B), the one end of the coil spring 92 is stored and held in the space within the rotation shaft 100. Accordingly, the one end of the coil spring 92 is received and supported by the rotation shaft 100.

The to-be-supported portion 89 is formed so as to be integrated with the leading end portion of the rotation shaft 100. The to-be-supported portion 89 projects outward in the axial direction from one end portion of the rotation shaft 100 in the axial direction (the end portion thereof at the projection side). The to-be-supported portion 89 is rotatably supported by the bearing (not shown) formed in the separation wall 74 (see FIG. 5), in a state where the roller unit 62 is stored in the roller storage portion 67 (see FIG. 5). When a rotational driving force is transferred from the drive shaft 63 to the to-be-supported portion 89, the rotational driving force is transferred from the to-be-supported portion 89 to the rotation shaft 100.

The coupling 91 is formed at an end portion of the to-be-supported portion 89 at one side (the right side in FIG. 9B). The coupling 91 is configured to be connectable to the coupling 77 formed at the drive shaft 63. The coupling 91 is connected to the coupling 77 and transfers a rotational driving force in the forward rotation direction 83 transferred from the drive shaft 63 to the rotation shaft 100, via the support member 95 to the rubber roller 87. The coupling 91 has a plurality of the projections 93. The projections 93 are formed on the inner circumferential surface of an inner hole 94 formed at a leading end of the to-be-supported portion 89 so as to extend in the axial direction. Specifically, the projections 93 project from the inner circumferential surface of the inner hole 94 toward the center of the inner hole 94. In the present embodiment, the coupling 91 has four projections 93 provided on the inner circumferential surface of the inner hole 94 at equal intervals in the circumferential direction thereof. Each projection 93 is formed with such a shape and size as to be able to be inserted into the groove 81 of the coupling 77 of the drive shaft 63.

As shown in FIG. 9A, of both side surfaces 93A and 93B of each projection 93, the side surface 93A at the upstream side in the forward rotation direction 83 is formed as a flat surface extending in the axial direction of the drive shaft 63. In addition, the other side surface 93B is also similarly formed as a flat surface. The side surface 93A of each projection 93 is brought into surface contact with the opposed surface 84 of the groove 81 when a rotational driving force in the forward rotation direction 83 is transferred to the drive shaft 63 in a state where each projection 93 is inserted into the groove 81. Thus, the rotational driving force is transferred from the coupling 77 to the coupling 91. It should be noted that even when a rotational driving force in the forward rotation direction 83 is transferred to the drive shaft 63, the side surface 93B at the downstream side in the forward rotation direction 83 is not brought into contact with the opposed surface 85 of the groove 81; and when an external force is applied in the opposite direction, the side surface 93B is brought into surface contact with the opposed surface 85.

As shown in FIG. 9B, the slide shaft 88 is provided in the internal space 95A of the support member 95. The slide shaft 88 is inserted into the internal space 95A of the support member 95 through a side surface (second side surface) at the other side in the axial direction of the central axis of the support member 95 (at the left side in FIG. 9B). In this state, the slide shaft 88 supports the support member 95 such that the support member 95 is slidable in the axial direction and is also rotatable about the axial direction (about the axis). In the present embodiment, the slide shaft 88 is provided in the internal space 95A so as to be slidable in the axial direction in the internal space 95A in a state where the coil spring 92 is interposed between the slide shaft 88 and the interior of the rotation shaft 100. In other words, the coil spring 92 is provided in a space extending from a leading end portion (one end portion at the rotation shaft 100 side) of the slide shaft 88 to the tubular space side of the interior of the rotation shaft 100 in the internal space 95A.

The slide shaft 88 includes, in the internal space 95A, a tubular spring holding portion 105 (an example of a tubular storage portion of the present disclosure) that stores the other end of the coil spring 92 and holds the coil spring 92. The spring holding portion 105 is provided at the leading end portion of the slide shaft 88 at the leading end side in the insertion direction thereof. The spring holding portion 105 is formed so as to be integrated with the slide shaft 88. The spring holding portion 105 is hollow. The internal space of the spring holding portion 105 is formed with such a size and shape as to allow the other end of the coil spring 92 to be stored therein. Therefore, when the slide shaft 88 is inserted through the opening 95B in a state where the coil spring 92 is disposed in the internal space 95A of the support member 95, the other end of the coil spring 92 is stored in the spring holding portion 105. Accordingly, the other end of the coil spring 92 is received and supported by the spring holding portion 105.

In the present embodiment, the spring holding portion 105 includes a later-described elastic engagement piece 103 and is formed with such a size as to be able to be fitted into the internal space of the rotation shaft 100. In other words, the internal space of the rotation shaft 100 is formed with such a size as to allow the leading end portion of the spring holding portion 105 to be fitted therein together with the elastic engagement piece 103. In addition, the spring holding portion 105 and the rotation shaft 100 are formed so as to be engaged with each other in the rotation direction about the axial direction of the support member 95 in a state of being fitted to each other. Specifically, each of the spring holding portion 105 and the rotation shaft 100 is formed in a cross-sectional shape that is a D shape. Thus, when a rotational driving force is transferred to the rotation shaft 100 in a state where the spring holding portion 105 and the rotation shaft 100 are fitted to each other, the rotational driving force is assuredly transferred to the slide shaft 88 via the spring holding portion 105 without the fitted portion being slid.

The to-be-supported portion 90 is formed at the other end (the end portion at the left side in FIG. 9B) of the slide shaft 88 so as to be integrated therewith. The to-be-supported portion 90 is an end portion at the other end of the slide shaft 88 (another end portion at the side opposite to the rotation shaft 100). The to-be-supported portion 90 is located coaxially with the to-be-supported portion 89 of the rotation shaft 100. In a state where the roller unit 62 is stored in the roller storage portion 67 (see FIG. 5), the to-be-supported portion 90 is rotatably supported by the bearing (not shown) formed in the separation wall 75 (see FIG. 5). Since the slide shaft 88 is configured as described above, when a rotational driving force is transferred from the drive shaft 63 to the to-be-supported portion 89, the rotational driving force is transferred from the rotation shaft 100 to the support member 95 and the slide shaft 88, and the support member 95 and the slide shaft 88 are rotated together. When the roller unit 62 is rotated as described above, the print sheet P is conveyed in a conveying direction (a direction toward the sheet feed opening 38) corresponding to the forward rotation direction 83 due to the contact friction between the rubber roller 87 and the print sheet P.

The coil spring 92 is provided in the internal space 95A in a compressed state where the coil spring 92 is compressed. Thus, the coil spring 92 is able to press the separation wall 98 of the support member 95 and the spring holding portion 105 of the slide shaft 88 in the axial direction with an elastic biasing force (biasing force) thereof. In other words, the coil spring 92 is able to bias the slide shaft 88 along the axial direction toward the to-be-supported portion 90 side (the left side in the FIG. 9B). In addition, a movement restriction mechanism 101 is provided in the roller unit 62. Movement of the slide shaft 88 and the support member 95 in a direction in which the slide shaft 88 and the support member 95 are separated from each other (the right-left direction in FIG. 9B) is restricted by the movement restriction mechanism 101. Thus, the coil spring 92 is allowed to be disposed in the internal space 95A in the compressed state. In a non-restricted state, by the elastic biasing force (pressing force) of the compressed coil spring 92 in the axial direction, the slide shaft 88 and the support member 95 are movable in the direction in which the slide shaft 88 and the support member 95 are separated from each other.

Meanwhile, when an engagement mechanism employing a conventional typical snap fit is used as the movement restriction mechanism 101, a biasing force of an elastic member such as a spring is always applied to an engagement portion of the snap fit. Thus, the snap fit itself deforms due to the constantly applied load, an engagement force at the engagement portion is decreased, and fixing of a shaft member may be released. As the movement restriction mechanism 101 of the present disclosure, a mechanism in which fixing is not easily released is realized with a simple configuration. Hereinafter, the movement restriction mechanism 101 will be described in detail.

As shown in FIG. 9B, the movement restriction mechanism 101 is an engagement mechanism referred to as so-called snap fit. The movement restriction mechanism 101 includes the elastic engagement piece 103 (an example of an engagement piece of the present disclosure), an engagement claw 106 (an example of a claw portion of the present disclosure), and an engagement groove 104 (an example of a slit of the present disclosure).

The elastic engagement piece 103 is formed so as to be integrated with the slide shaft 88, and is provided on the circumferential surface of the spring holding portion 105 of the slide shaft 88. The elastic engagement piece 103 extends in an outer peripheral wall of the spring holding portion 105 from a base end portion of the spring holding portion 105 toward a leading end of the spring holding portion 105 in the axial direction. A portion of the elastic engagement piece 103 at the base end portion side of the spring holding portion 105 is connected to the outer peripheral wall, and the other portion thereof is separated from the outer peripheral wall. Thus, the elastic engagement piece 103 is elastically bendable in the internal space 95A in a perpendicular direction perpendicular to the axial direction with the portion thereof at the base end portion side as a fulcrum.

The engagement groove 104 is integrally formed in the rotation shaft 100, and is provided in the outer circumferential surface thereof. The engagement groove 104 is a slit-shaped through groove extending through the outer peripheral wall of the rotation shaft 100. The engagement groove 104 extends in the axial direction from a base end portion of the outer peripheral wall of the rotation shaft 100 at the separation wall 98 side. In other words, the engagement groove 104 is a slit extending through the outer peripheral wall of the rotation shaft 100 in the axial direction. In the present embodiment, the engagement groove 104 is formed in a portion from an end portion 99 at the separation wall 98 side to the to-be-supported portion 89.

The engagement claw 106 is provided at the elastic engagement piece 103. Specifically, the engagement claw 106 is formed at a leading end of the elastic engagement piece 103. The engagement claw 106 protrudes from the outer side surface of the outer peripheral wall of the spring holding portion 105 outward in the perpendicular direction. Meanwhile, the inner side of the engagement claw 106 is located on the same surface as the inner side surface of the spring holding portion 105. The engagement claw 106 is a claw portion that is able to be inserted into the engagement groove 104, and is relatively movable along the engagement groove 104 in the axial direction in a state where the engagement claw 106 inserted into the engagement groove 104. In addition, the engagement claw 106 is configured to be engageable with the end portion 99 of the engagement groove 104 at the separation wall 98 side. By the engagement claw 106 being engaged with the end portion 99, movement of the slide shaft 88 and the support member 95 in the direction in which the slide shaft 88 and the support member 95 are separated from each other is restricted. The engagement claw 106 is provided at the elastic engagement piece 103 which is bendable in the perpendicular direction. Thus, the engagement claw 106 is also elastically bendable in the perpendicular direction with bending of the elastic engagement piece 103. As a result, the elastic engagement piece 103 is elastically deformable in a retraction direction in which the engagement claw 106 moves from the outer peripheral wall of the spring holding portion 105 toward the inner side thereof.

Since the movement restriction mechanism 101 is configured as described above, movement of the slide shaft 88 in a direction in which the slide shaft 88 is pulled out from the internal space 95A of the support member 95 is restricted by the engagement of the engagement claw 106 with the end portion 99 of the engagement groove 104 at the separation wall 98 side. On the other hand, the engagement claw 106 does not restrict movement of the slide shaft 88 in a direction in which the slide shaft 88 comes close to the separation wall 98 side. In other words, when the slide shaft 88 is moved toward the separation wall 98 side against the elastic biasing force of the coil spring 92, the engagement claw 106 is separated from the end portion 99 of the engagement groove 104 and moves along the engagement groove 104 toward the to-be-supported portion 89 side (the right side in FIG. 9B). Thus, when an external force greater than the biasing force of the coil spring 92 is applied in the axial direction, the slide shaft 88 and the support member 95 slide in the axial direction relative to each other and the interval between the to-be-supported portion 89 and the to-be-supported portion 90 is decreased. Therefore, the user is allowed to separate the coupling 91 of the to-be-supported portion 89 from the coupling 77 of the drive shaft 63 to release the engagement of these couplings only by applying an external force to the roller unit 62 in the axial direction. Accordingly, the user is allowed to easily remove the roller unit 62 from the roller storage portion 67 (see FIG. 5) and easily mount the roller unit 62 in the roller storage portion 67.

In addition, since the elastic engagement piece 103 is formed at the outer peripheral wall of the spring holding portion 105, when the coil spring 92 is stored in the spring holding portion 105, the coil spring 92 is disposed so as to extend along the back surface of the elastic engagement piece 103 (the surface thereof at the side on which the engagement claw 106 is not provided). Accordingly, the back surface of the elastic engagement piece 103 is supported by the coil spring 92. Thus, for example, even when the elastic engagement piece 103 has been deformed due to aged deterioration, load fatigue, or the like thereof, even when the elastic force of the elastic engagement piece 103 in the bending direction thereof has been decreased, or even when a great external force is applied in a direction in which the slide shaft 88 is moved away, since the elastic engagement piece 103 is supported by the coil spring 92, the elastic engagement piece 103 is prevented from being bent in a direction in which the engagement of the engagement claw 106 is released.

In assembling the roller unit 62, first, the coil spring 92 is stored in the spring holding portion 105 of the slide shaft 88. In this state, the elastic engagement piece 103 has not been bent, and the engagement claw 106 also has not been elastically deformed. In addition, the coil spring 92 has not been compressed, and has its natural length. In the state where the coil spring 92 is stored in the spring holding portion 105, when the coil spring 92, together with the slide shaft 88, is inserted into the internal space 95A through the opening 95B, the coil spring 92 enters into the interior of the rotation shaft 100. When the coil spring 92 is further inserted, the coil spring 92 is compressed in the axial direction. When the compression has proceeded to a certain extent, the leading end of the spring holding portion 105 is inserted into the interior of the rotation shaft 100 next. At that time, by the engagement claw 106 being pressed by the inner wall of the rotation shaft 100, the engagement claw 106 is elastically deformed and bent toward the inner side of the spring holding portion 105. At that time, the engagement claw 106 is in a state of not being inserted into the engagement groove 104, and in this non-inserted state, the coil spring 92 permits the engagement claw 106 to be elastically deformed and bent toward the inner side. In other words, in this non-inserted state, the coil spring 92 has not come into a predetermined compressed state, its spring force is still weak, and the pitches of the coil spring 92 are wide. When the engagement claw 106 is bent at that time, the bent engagement claw 106 enters into the gap of the coil spring 92 without interruption by the coil spring 92. If the wire portion of the coil spring 92 is present in the bending direction of the engagement claw 106, since the pitches are wide and the spring force is weak, the corresponding pitch of the coil spring 92 is easily increased, and the engagement claw 106 bent toward the inner side enters into the corresponding gap of the coil spring 92. On the other hand, when the engagement claw 106 is inserted into the engagement groove 104 to be engaged with the end portion 99, the engagement claw 106 is prevented from being elastically deformed and bent in the perpendicular direction. In other words, the engagement claw 106 returns to the original state which is before the elastic deformation thereof. At that time, the coil spring 92 comes into the compressed state in which a spring force is generated as designed, and is stored in the spring holding portion 105 in a state where the pitches thereof are uniform. In this state, the wire portion of the coil spring 92 is disposed on the back surface of the engagement claw 106, and elastic deformation of the engagement claw 106 is prevented by the coil spring 92.

In the above-described embodiment, the coil spring 92 has been described as an example of the biasing member, but the elastic member is not limited to the coil spring 92. Any member may be used as the elastic member as long as the member is configured to generate an elastic force in the axial direction and be able to support the back surface of the elastic engagement piece 103.

In addition, in the above-described embodiment, the manual sheet feeder 60 including the roller unit 62 which conveys the print sheet P on the manual tray 44 has been described as an example, but the present disclosure is not limited to the manual sheet feeder 60. The conveying roller unit and the sheet conveying device of the present disclosure are also applicable to a configuration in which rotators, such as the pick-up rollers 51 of the sheet feed cassettes 27 and 28, the feed roller 46A of the feeding mechanism 46 of the ADF 13, and various conveying rollers arranged on the vertical conveyance path 26 or the like, are rotated to convey a print sheet or a document.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A conveying roller unit comprising:
a support member formed in a cylindrical shape having an internal space, and including an outer peripheral portion on which a roller member is provided;
a first rotation shaft portion provided at a first side surface of the support member at one side in an axial direction thereof and having a cylindrical shape including a tubular space therein forming a part of the internal space;
a second rotation shaft portion having one end portion inserted from a second side surface of the support member at another side in the axial direction through the internal space of the support member into the tubular space of the first rotation shaft portion, and another end portion protruding from the second side surface of the support member, the second rotation shaft portion being supported by the support member so as to be slidable in the axial direction; and
a biasing member provided from the one end portion side to the tubular space side in the internal space and configured to bias the second rotation shaft portion along the axial direction toward the other end side, wherein
the one end portion of the second rotation shaft portion includes a tubular storage portion configured to be able to store the biasing member therein,
the tubular storage portion includes, at a part of a circumferential surface thereof, an engagement piece extending in the axial direction,
the engagement piece includes, at a leading end thereof, a claw portion protruding outward from the circumferential surface, and is configured to be elastically deformable in a retraction direction in which the claw portion is retracted from the circumferential surface toward an inner side,
the first rotation shaft portion has, in a circumferential surface thereof, a slit which extends in the axial direction and with which the claw portion is engageable, and
the engagement piece is configured to be brought into contact with a side surface of the biasing member at an engagement position where the claw portion is engaged with an end portion of the slit at the base end portion side, by a biasing force of the biasing member, whereby elastic deformation of the engagement piece in the retraction direction is prevented.

2. The conveying roller unit according to claim 1, wherein the biasing member is a coil spring.

3. The conveying roller unit according to claim 2, wherein the coil spring permits the engagement piece to be elastically deformed in the retraction direction in a state where the claw portion is not inserted into the slit, and prevents the engagement piece from being elastically deformed in the retraction direction in a state where the claw portion is inserted into the slit.

4. The conveying roller unit according to claim 3, wherein the coil spring is compressed in the state where the claw portion is inserted into the slit.

5. A sheet conveying device configured such that the conveying roller unit according to claim 1 is mountable thereon and dismountable therefrom, the sheet conveying device comprising:
a drive transfer mechanism configured to transfer a rotational driving force to the conveying roller unit in a state where the conveying roller unit is mounted.

6. The sheet conveying device according to claim 5, wherein the drive transfer mechanism includes:
a drive shaft configured to transfer the rotational driving force to the conveying roller unit;
a drive-side coupling provided at a leading end of the drive shaft; and
a roller-side coupling provided at a leading end of the first rotation shaft portion and connectable to the drive-side coupling.

7. An image processing apparatus comprising the sheet conveying device according to claim 5.

* * * * *